United States Patent
Umino et al.

(10) Patent No.: US 9,630,559 B2
(45) Date of Patent: Apr. 25, 2017

(54) VEHICLE VISUAL RECOGNITION DEVICE

(71) Applicant: KABUSHIKI KAISHA TOKAI-RIKA-DENKI-SEISAKUSHO, Aichi-ken (JP)

(72) Inventors: Kazuya Umino, Aichi-ken (JP); Shigeki Yoshida, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 14/834,123

(22) Filed: Aug. 24, 2015

(65) Prior Publication Data
US 2016/0059784 A1   Mar. 3, 2016

(30) Foreign Application Priority Data

Aug. 26, 2014   (JP) ................. 2014-171553

(51) Int. Cl.
*B60R 1/06*   (2006.01)
*B60R 1/074*   (2006.01)

(52) U.S. Cl.
CPC .............. *B60R 1/06* (2013.01); *B60R 1/074* (2013.01)

(58) Field of Classification Search
CPC .................................. B60R 1/06; B60R 1/074
USPC ........ 296/11, 1.11, 180.1; 356/267; 359/507, 359/267, 850
See application file for complete search history.

(56) References Cited

U.S. PATENT DOCUMENTS

| | | |
|---|---|---|
| 2005/0152053 A1 | 7/2005 | Onuki |
| 2012/0145871 A1 | 6/2012 | Kawanishi |
| 2012/0229882 A1* | 9/2012 | Fish, Jr. ................. B60R 1/025 359/267 |

FOREIGN PATENT DOCUMENTS

| | | |
|---|---|---|
| JP | 2011-005915 A | 1/2011 |
| JP | 2014004960 A | 1/2014 |

OTHER PUBLICATIONS

Extended European Search Report for Application No. 15182104.8-1503 dated Jan. 19, 2016.

* cited by examiner

*Primary Examiner* — Joseph D Pape
*Assistant Examiner* — Dana Ivey
(74) *Attorney, Agent, or Firm* — Roberts Mlotkowski Safran Cole & Calderon, P.C.

(57) ABSTRACT

In a vehicle door mirror device, in a contact tube of a motor base, projection leading end faces of second contact ribs are disposed at radial direction inside of a circular circumferential face in which projection leading end faces of first contact ribs are disposed. The projection leading end faces of the second contact ribs have a smaller gap dimension to a support tube of a support shaft than gap dimension of the projection leading end faces of the first contact ribs to the support tube in a state in which a drive body is not tilted with respect to the support shaft. This thereby enables tilting of the drive body with respect to the support shaft to be effectively suppressed.

8 Claims, 6 Drawing Sheets

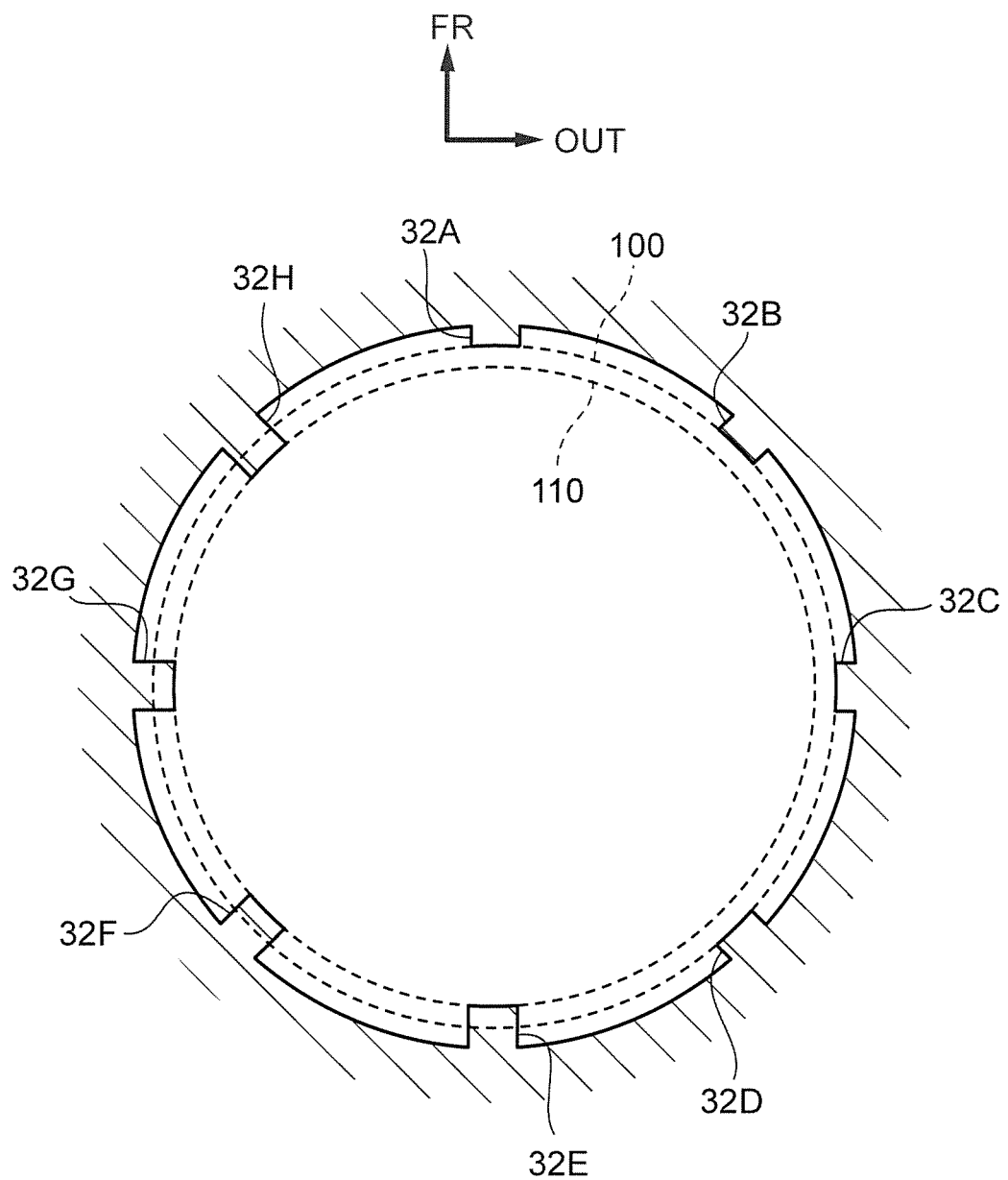

VEHICLE VISUAL RECOGNITION DEVICE

CROSS-REFERENCE TO RELATED APPLICATION

This application claims priority under 35 USC 119 from Japanese Patent Application No. 2014-171553 filed Aug. 26, 2014, the disclosure of which is incorporated by reference herein.

BACKGROUND

Field of the Invention

The present invention relates to a vehicle visual recognition device to assist vision of a vehicle occupant.

Related Art

In a door mirror device described in Japanese Patent Application Laid-Open (JP-A) No. 2011-5915, an upper end portion of a support shaft is inserted into a support hole with a substantially circular ring shaped cross-section profile in a motor base, such that the support shaft supports the motor base so as to be capable of rotating. The motor base is provided with plural ribs at an outer peripheral face of the support hole. The plural ribs are separated from each other around the peripheral direction of the support hole, and project out from the outer peripheral face of the support hole toward the side of the support shaft (the radial direction inside of the support hole).

In this door mirror device, each of the ribs projects out from the outer peripheral face of the support hole by the same amount, and in a state in which the support hole is disposed coaxially to the support shaft, and the motor base is not tilted with respect to the support shaft, small gaps with the same dimensions as each other are provided between each of the ribs and the outer peripheral face of the support shaft, thereby suppressing tilting of the motor base with respect to the support shaft.

SUMMARY

In consideration of the above circumstances, a vehicle visual recognition device capable of effectively suppressing tilting of a rotating member with respect to a support shaft is obtained.

A vehicle visual recognition device of a first aspect includes: a support shaft that is supported at a vehicle body side; a rotating member that is rotatably supported at the support shaft; a plurality of contact portions that are provided at the rotating member and that are capable of contacting the support shaft, wherein at least one of the contact portions is disposed at an inner side in a radial direction of a circumference at which another of the contact portions is disposed; and a visual recognition section that is provided so as to be capable of rotating integrally with the rotating member, that assists visual recognition of a vehicle occupant, and that is stored or deployed by rotating the rotating member.

A vehicle visual recognition device of a second aspect includes: a support shaft that is supported at a vehicle body side; a rotating member that is rotatably supported at the support shaft; a plurality of contact portions that are provided at the rotating member and that are capable of contacting the support shaft, wherein a gap dimension between at least one of the contact portions and the support shaft is smaller than a gap dimension between another of the contact portions and the support shaft, in a state in which the rotating member is not tilted with respect to the support shaft; and a visual recognition section that is provided so as to be capable of rotating integrally with the rotating member, that assists visual recognition of a vehicle occupant, and that is stored or deployed by rotating the rotating member.

A vehicle visual recognition device of a third aspect is the vehicle visual recognition device of either the first aspect or the second aspect, wherein the at least one of the contact portions is a contact portion on which movement force toward a side of the support shaft acts when the rotating member is rotated and a force to tilt with respect to the support shaft acts on the rotating member.

A vehicle visual recognition device of a fourth aspect is the vehicle visual recognition device of any one of the first aspect to the third aspect, wherein the at least one of the contact portions is a contact portion on which movement force toward a side of the support shaft acts due to a force to tilt with respect to the support shaft side acting on the rotating member due to a load of the visual recognition section.

In the vehicle visual recognition device of the first aspect, the support shaft is supported on the vehicle body side, and the rotating member is supported by the support shaft so as to be capable of rotating. Moreover, the visual recognition section is provided so as to be capable of rotating together with the rotating member, and the visual recognition section assists visual recognition of the vehicle occupant, and is stored (housed) or deployed by rotating the rotating member. The rotating member is provided with the plural contact portions, and the contact portions are capable of contacting the support shaft.

The at least one of the contact portions is (are) disposed at the radial direction inside of the circumference on which the another of the contact portions is (are) disposed. This thereby enables tilting of the rotating member with respect to the support shaft to be effectively suppressed.

In the vehicle visual recognition device of the second aspect, the support shaft is supported on the vehicle body side, and the rotating member is supported by the support shaft so as to be capable of rotating. Moreover, the visual recognition section is provided so as to be capable of rotating together with the rotating member, and the visual recognition section assists visual recognition of the vehicle occupant, and is stored (housed) or deployed by rotating the rotating member. The rotating member is provided with the plural contact portions, and the contact portions are capable of contacting the support shaft.

A gap dimension between the at least one of the contact portions and the support shaft is smaller than a gap dimension between the another of the contact portions and the support shaft in the state in which the rotating member is not tilted with respect to the support shaft. This thereby enables tilting of the rotating member with respect to the support shaft to be effectively suppressed.

In the vehicle visual recognition device of the third aspect, the at least one contact portion is(are) a contact portion(s) on which movement force toward the support shaft side acts when a force to tilt with respect to the support shaft acts on the rotating member when rotating of the rotating member. This thereby enables tilting of the rotating member with respect to the support shaft to be efficiently suppressed.

In the vehicle visual recognition device of the fourth aspect, the at least one contact portion is(are) a contact portion(s) on which movement force toward the support shaft side acts due to a force to tilt with respect to the support shaft acting on the rotating member due to load of the visual recognition section. This thereby enables tilting of the rotating member with respect to the support shaft to be efficiently suppressed.

BRIEF DESCRIPTION OF THE DRAWINGS

Exemplary embodiment will be described in detail with reference the following figures, wherein:

FIG. 6 illustrates imaginary circular circumferential planes on which contact ribs of a vehicle door mirror device of an exemplary embodiment, as viewed from above.

DETAILED DESCRIPTION

Figure 1:
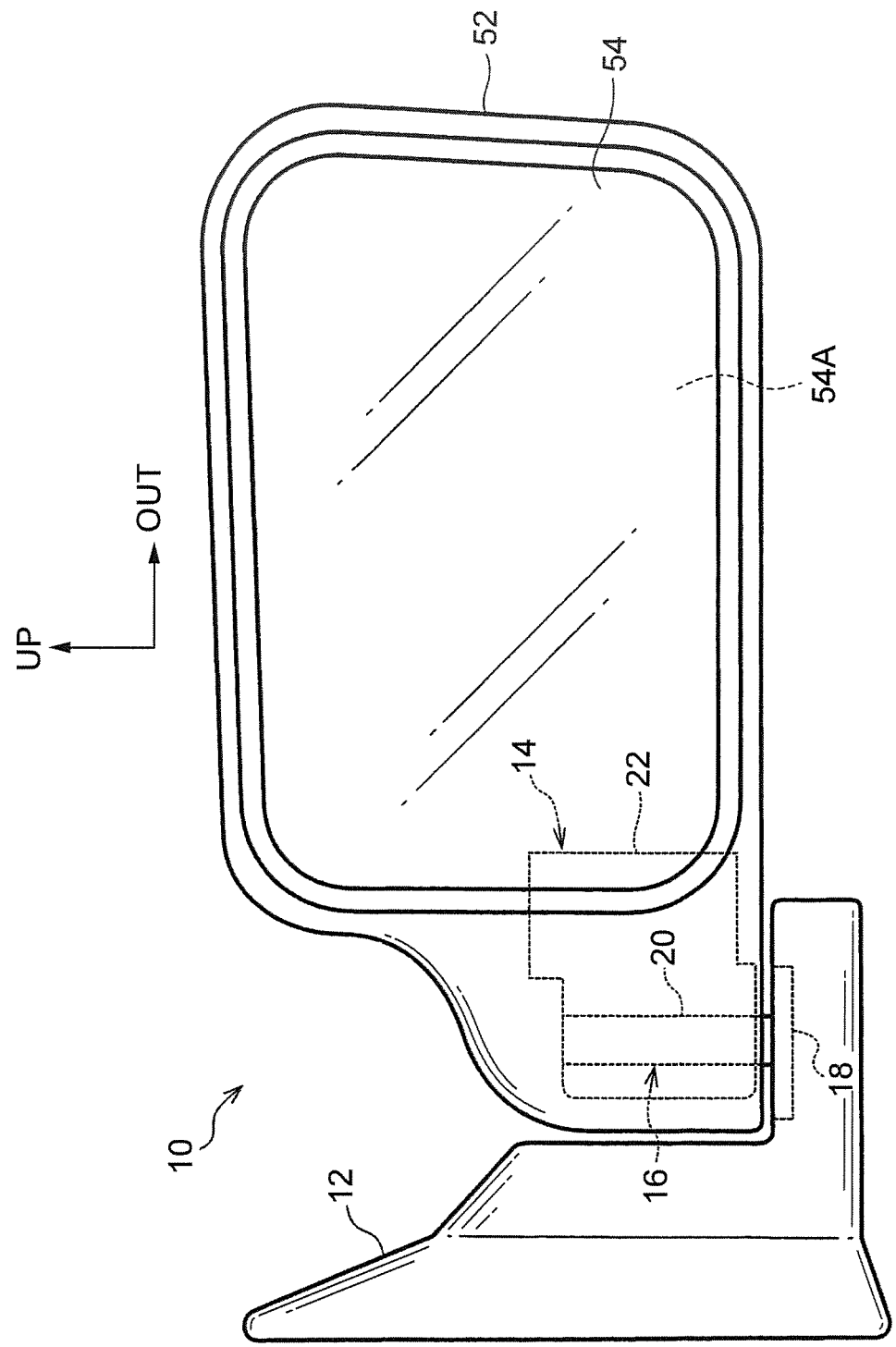
FIG. 1 is a face-on view illustrating a vehicle door mirror device according to an exemplary embodiment, as viewed from the vehicle rear.
Figure 2:
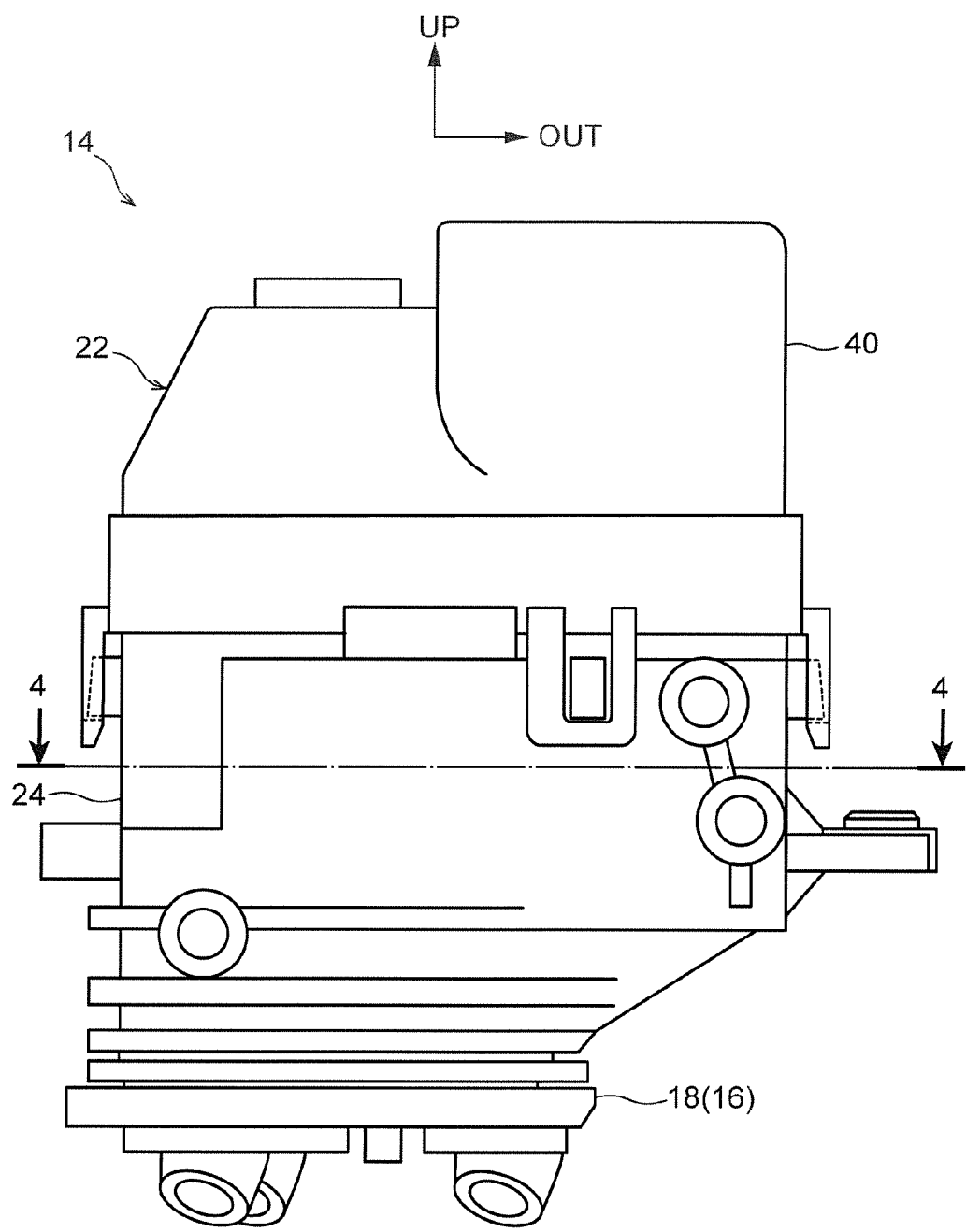
FIG. 2 is a face-on view illustrating a storing mechanism of a vehicle door mirror device of an exemplary embodiment, as viewed from the vehicle rear.
Figure 3:
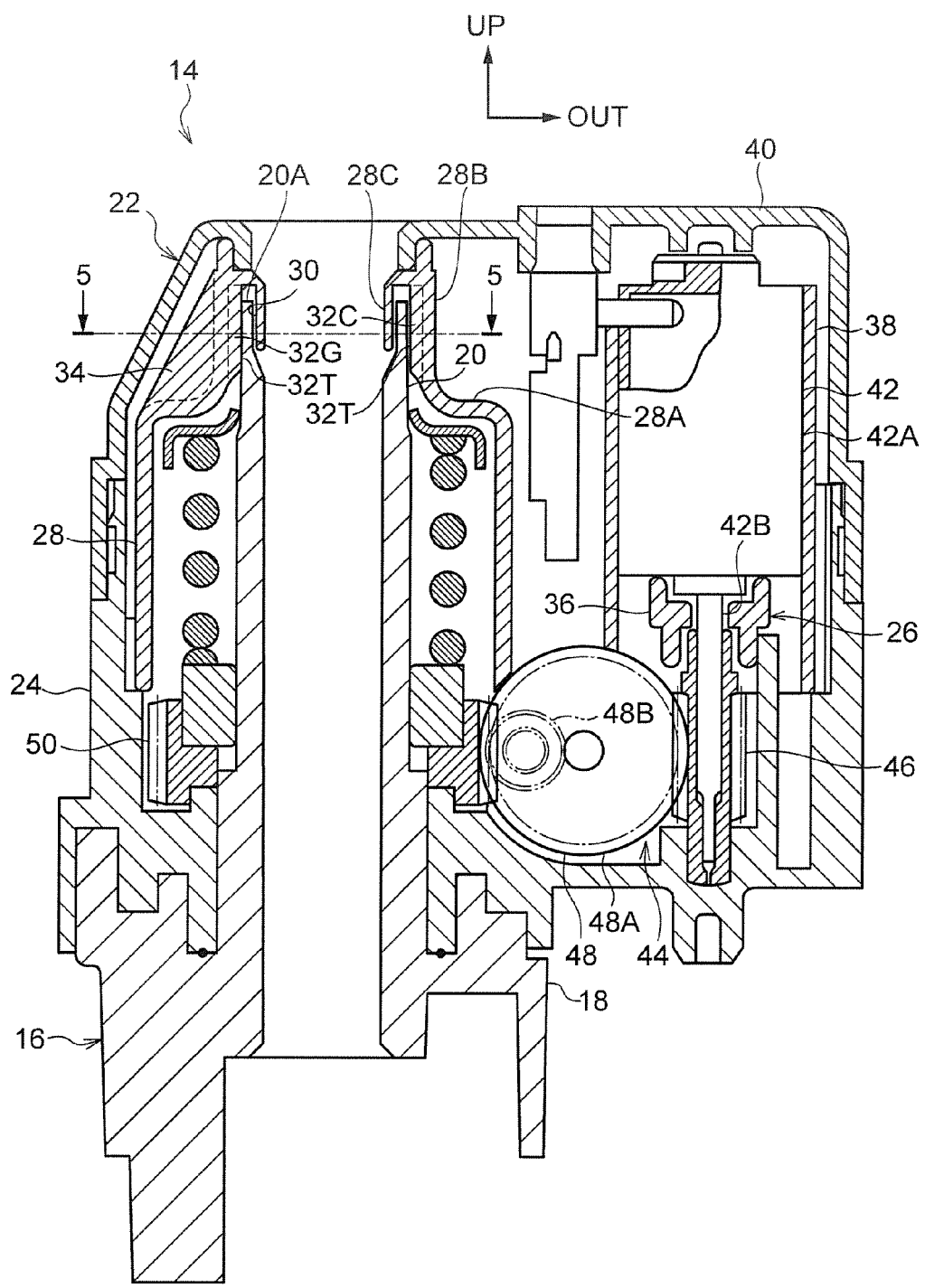
FIG. 3 is a cross-section illustrating a storing mechanism of a vehicle door mirror device of an exemplary embodiment, as viewed from the vehicle rear.

FIG. 1 is a front-on view of a vehicle door mirror device 10 (vehicle mirror device) serving as a vehicle visual recognition device according to an exemplary embodiment, as viewed from the vehicle rear. Note that in the drawings, the arrow FR indicates the vehicle front, the arrow OUT indicates outward in the vehicle width direction (the right of the vehicle), and the arrow UP indicates upward.

The vehicle door mirror device 10 according to the present exemplary embodiment is provided at an up-down direction intermediate portion and vehicle front side end of a side door (specifically, a front side door), serving as a door of a vehicle, and is disposed at the outside of the vehicle.

As illustrated in FIG. 1, the vehicle door mirror device 10 includes a stay 12 serving as an installation member configuring a support body. A vehicle width direction inside end of the stay 12 is fixed to the side door, thereby installing the vehicle door mirror device 10 to the side door.

A storing (housing) mechanism 14 (retractor) is supported at an upper side of a vehicle width direction outside portion of the stay 12.

As illustrated in FIG. 2 to FIG. 5, the storing mechanism 14 is provided with a metal stand 16, serving as a support member configuring the support body. A substantially circular plate shaped fixing portion 18 is provided at a lower end of the stand 16, and the stand 16 is fixed to the stay 12 by fixing the fixing portion 18 to the stay 12, thereby supporting the storing mechanism 14 on the stay 12.

A substantially circular cylinder shaped support shaft 20 is integrally provided to an upper side of the fixing portion 18, and the support shaft 20 stands upright from the fixing portion 18 such that its axial direction is parallel to the up-down direction. An upper end portion of the support shaft 20 configures a circular cylinder shaped support tube 20A serving as a support portion. The support tube 20A is disposed coaxially to the support shaft 20.

A drive body 22, configuring a rotating (swinging) body, is supported on the support shaft 20 so as to be capable of rotating (swinging).

A container shaped case 24, made from resin and serving as a base member, is provided at a lower side portion of the drive body 22. An upper face of the case 24 is open. The support shaft 20 of the stand 16 penetrates, and is substantially fitted together with, a vehicle width direction inside portion of a bottom wall of the case 24, and the case 24 is supported on the support shaft 20 so as to be capable of rotating (swinging).

A motor base 26, serving as a rotating member, is fixed inside an upper portion of the case 24, and the motor base 26 is integrated together with the case 24.

A substantially circular cylinder shaped housing tube 28 is provided at a vehicle width direction inside portion of the motor base 26. An interior portion of the housing tube 28 is open at an upper side and at a lower side, and the support shaft 20 is housed inside the interior portion. An annular plate shaped stepped wall 28A is provided between an upper side portion and a lower side portion of the housing tube 28. The stepped wall 28A is disposed orthogonally to the axial direction of the housing tube 28.

A contact tube 28B is provided at a portion of the housing tube 28 at the upper side of the stepped wall 28A. The contact tube 28B has a smaller diameter than, and is disposed coaxially to, a lower side portion of the housing tube 28. A circular cylinder shaped insertion tube 28C is provided coaxially to, and in the vicinity of the inside of, the contact tube 28B. An upper end of the insertion tube 28C is integrated together with the contact tube 28B. A contact hole 30 with a substantially circular ring shaped cross-section profile is formed between the contact tube 28B and the insertion tube 28C, and a lower side of the contact hole 30 is open. The support tube 20A of the support shaft 20 of the stand 16 is inserted into the contact hole 30, and the insertion tube 28C is inserted inside the support tube 20A.

Plural contact ribs 32A to 32H (eight in the present exemplary embodiment), serving as projection portions, and each with a rectangular cross-section profile, are integrally provided to an inner peripheral face of the contact tube 28B. The contact ribs 32A to 32H each extend along the axial direction of the contact tube 28B, and project out (protrude) toward the radial direction inside of the contact tube 28B (toward the center axis of the contact tube 28B). The contact ribs 32A to 32H are disposed at uniform intervals therebetween around the circumferential direction of the contact tube 28B. The contact rib 32A, the contact rib 32B, the contact rib 32C, the contact rib 32D, the contact rib 32E, the contact rib 32F, the contact rib 32G, and the contact rib 32H are respectively disposed at a vehicle front side end, at a vehicle front side and vehicle width direction outside, at a vehicle width direction outside end, at a vehicle rear side and vehicle width direction outside, at a vehicle rear side end, at a vehicle rear side and vehicle width direction inside, at a vehicle width direction inside end, and at a vehicle front side and vehicle width direction inside, of the inner peripheral face of the contact tube 28B. Each of the contact ribs (first contact ribs) 32A to 32D projects out from the contact tube 28B by the same amount, and each of the contact ribs (second contact ribs) 32E to 32H projects out from the contact tube 28B by the same amount. Projecting amount of the contact ribs 32E to 32H from the contact tube 28B is larger than projecting amount of the contact ribs 32A to 32D from the contact tube 28B (The contact ribs 32E to 32H project out further from the contact tube 28B than the contact ribs 32A to 32D). Accordingly, projection leading end faces 32T, serving as contact portions of the contact ribs 32E to 32H, are disposed at the radial direction inner side than an imaginary circular circumferential plane 100 on which projection leading end faces 32T, serving as contact portions of the contact ribs 32A to 32D, is disposed (FIG. 6). The projection leading end faces 32T of the contact ribs 32A to 32D are disposed at the radial direction outer side than an imaginary circular circumferential plane 110 on which the projection leading end faces 32T of the contact ribs 32E to 32H are disposed (FIG. 6). The projection leading end faces 32T of the contact ribs 32A to 32H are capable of contacting the outer peripheral face of the support tube 20A in a state in which at least the drive body 22 is tilted with respect to the support shaft 20 (in a state in which an axial direction of the support shaft 20 and a rotation axial direction about which the drive body 22 is rotated do not coincide with each other).

In a state in which the drive body 22 is not tilted with respect to the support shaft 20 (in a state in which the axial direction of the support shaft 20 and the rotation axial direction about which the drive body 22 is rotated coincide with each other), the contact hole 30 and the insertion tube 28C are disposed coaxially to the support tube 20A. Gap dimensions between the projection leading end faces 32T of the contact ribs 32E to 32H and the outer peripheral face of the support tube 20A (the smallest gap dimension thereof in the radial direction of the support tube 20A) are set smaller than gap dimensions between the projection leading end faces 32T of the contact ribs 32A to 32D and the outer peripheral face of the support tube 20A (the smallest gap dimension thereof in the radial direction of the support tube 20A). For example, the gap dimensions between the projection leading end faces 32T of the contact ribs 32E to 32H and the outer peripheral face of the support tube 20A is from 0 mm (equal to or more than 0 mm) to 0.1 mm (equal to or less than 0.1 mm) (namely, it is possible that the projection leading end faces 32T of the contact ribs 32E to 32H contact the outer peripheral face of the support tube 20A), and the gap dimensions between the projection leading end faces 32T of the contact ribs 32A to 32D and the outer peripheral face of the support tube 20A is 0.2 mm. A gap dimension between an outer peripheral face of the insertion tube 28C and an inner peripheral face of the support tube 20A (the smallest gap dimension thereof in the radial direction of the support tube 20A) is, for example, 0.2 mm.

Plural substantially triangular plate shaped reinforcement ribs 34 (five in the present exemplary embodiment) are provided to the portion of the housing tube 28 at the upper side of the stepped wall 28A. The reinforcement ribs 34 are disposed parallel to the axial direction and the radial directions of the housing tube 28. The reinforcement ribs 34 are integrated together with the stepped wall 28A and the contact tube 28B of the housing tube 28, and are respectively disposed facing the contact ribs 32A, and 32E to 32H such that the contact tube 28B is between the reinforcement ribs 34 and the contact ribs 32A, and 32E. The reinforcement ribs 34 reinforce vehicle width direction inside portions of the stepped wall 28A and the contact tube 28B.

A substantially semi-elliptical plate shaped bottom plate 36 is provided at a vehicle width direction outside portion of the motor base 26. The bottom plate 36 is integrated together with a lower end of the housing tube 28. A substantially rectangular tube shaped assembly tube 38 is integrally provided to an upper side of the bottom plate 36, and the axial direction of the assembly tube 38 is parallel with the up-down direction.

A container shaped cover 40 made from resin, serving as a covering member, is provided at an upper side of the case 24 and the motor base 26. A lower face of the cover 40 is open. The outer periphery of an upper end of the case 24 fits together with a lower end of the cover 40, and the cover 40 covers over the upper side of the case 24 and the motor base 26 and is integrated with the case 24.

A motor 42, serving as a drive section, is assembled to the vehicle width direction outside portion of the motor base 26. A main body 42A of the motor 42 is fixed inside the assembly tube 38 of the motor base 26, and an output shaft 42B of the motor 42 penetrates the bottom plate 36 of the motor base 26 and extends out toward the lower side of the motor base 26. The motor 42 is electrically connected to a control device (not illustrated in the drawings) in the vehicle, and the motor 42 is driven under control of the control device, thereby rotating the output shaft 42B of the motor 42.

A rotating mechanism 44 (gear mechanism) is provided inside the case 24.

A worm gear 46, serving as a gear member (first step gear) is provided to the rotating mechanism 44 at the lower side of the motor 42. The worm gear 46 is attached coaxially to the output shaft 42B of the motor 42. The worm gear 46 is capable of rotating together with the output shaft 42B, and the worm gear 46 is rotated by rotation of the output shaft 42B.

A worm shaft 48, serving as a communication (connecting) gear (intermediate gear) is provided to the rotating mechanism 44 at the vehicle width direction inside of the worm gear 46. The worm shaft 48 is rotatably supported on the case 24. A helical gear portion 48A (worm wheel gear) is provided at one end side portion (a vehicle rear side portion) of the worm shaft 48, and a worm gear portion 48B is provided at another end side portion (vehicle front side portion) of the worm shaft 48. The helical gear portion 48A enmeshes with the worm gear 46, and the worm shaft 48 (the helical gear portion 48A and the worm gear portion 48B) is rotated by rotation of the worm gear 46.

At the support shaft 20 of the stand 16, a gear plate 50 (worm wheel), serving as a fix-gear (final gear) is provided. The gear plate 50 is penetrated coaxially by the support shaft 20, and is supported by the support shaft 20 in a rotation-restricted state. The worm gear portion 48B of the worm shaft 48 enmeshes with the gear plate 50, and the worm gear portion 48B rotates about the gear plate 50 by the worm gear portion 48B being rotated. The drive body 22 accordingly rotates about the support shaft 20 as center, together with (integrally with) the worm gear portion 48B.

The drive body 22 is housed at a vehicle width direction inside portion of a substantially rectangular container shaped visor 52, serving as a housing member, configuring the rotating body. A vehicle rear side face of the visor 52 is open. A substantially rectangular plate shaped mirror 54, configuring the rotating body, is disposed inside the visor 52, in the vicinity of the vehicle rear side face (open portion). The visor 52 covers the entire periphery and the vehicle front side face of the mirror 54. A mirror face 54A of the mirror 54 faces toward the vehicle rear side, and the mirror 54 assists a vehicle occupant (in particular, the driver) visual recognizing (viewing) of the vehicle rear side.

The visor 52 and the mirror 54 are coupled to, and supported by, the case 24 of the drive body 22, and the visor 52 and the mirror 54 are capable of rotating (swinging) about the support shaft 20 as center together with (integrally with) the drive body 22. Since the visor 52, the mirror 54, and the like are supported by the case 24, tilt force, tilting with respect to the support shaft 20, acts to the drive body 22 in a direction in which a portion thereof at the vehicle width direction outer side than the support shaft 20 moves toward the lower side, and in a direction in which the motor base 26 moves towards the vehicle width direction outer side, due to the load (weight) of the visor 52, the mirror 54, and the like.

When the motor 42 is driven and the output shaft 42B rotates in one direction, the visor 52 and the mirror 54 are rotated (swung), together with the drive body 22, toward the vehicle rear side and the vehicle width direction inside. Due thereto, due to the drive body 22 being rotated to a stored (housed) position, the visor 52 and the mirror 54 cease to project out with respect to the side door (the project state is released), and are stored (housed). When housing the visor 52 and the mirror 54, movement force (a combined force of a sliding force toward one end side of the worm shaft 48 and a separating force toward the radial direction outside at the enmeshed portion of the gear plate 50 with the worm gear portion 48B) from the gear plate 50 to the worm shaft 48 acts in the direction of arrow P in FIG. 4, and tilt force tilting with respect to the support shaft 20 acts on the drive body 22 in a direction in which the motor base 26 is moved in the direction of arrow P.

On the other hand, when the motor 42 is driven and the output shaft 42B rotates in another direction, the visor 52 and the mirror 54 are rotated (swung), together with (integrally with) the drive body 22, toward the vehicle front side and the vehicle width direction outside. Due thereto, due to the drive body 22 being rotated (swung) to a deploy (stand) position (an in-use position, a return position), the visor 52 and the mirror 54 project out from the side door, and are deployed (opened, returned). When deploying (standing) the visor 52 and the mirror 54, movement force (a combined force of a sliding force toward another end side of the worm shaft 48 and a separating force toward the radial direction outside at the enmeshed portion of the gear plate 50 with the worm gear portion 48B) from the gear plate 50 to the worm shaft 48 acts in the direction of arrow Q in FIG. 4, and tilt force tilting with respect to the support shaft 20 acts on the drive body 22 in a direction in which the motor base 26 is moved in the direction of arrow Q.

Next, explanation follows regarding operation of the present exemplary embodiment.

In the vehicle door mirror device 10 configured as described above, the visor 52, the mirror 54, and the like are supported by the case 24 of the drive body 22 of the storing mechanism 14, so, tilt force tilting with respect to the support shaft 20 of the stand 16 acts on the drive body 22 in a direction in which the motor base 26 is moved toward the vehicle width direction outside, due to the load of the visor 52, the mirror 54, and the like. Movement force accordingly acts on the contact ribs 32F to 32H of the contact tube 28B of the motor base 26 toward the side of the support tube 20A of the support shaft 20.

In the storing mechanism 14, the motor 42 is driven under control of the control device to rotate the output shaft 42B. Accordingly, in the rotating mechanism 44, the worm gear 46 rotates together with the output shaft 42B to rotate the worm shaft 48 (the helical gear portion 48A and the worm gear portion 48B), such that the worm gear portion 48B rotates about the gear plate 50, and the drive body 22 rotates about support shaft 20 as center together with the worm gear portion 48B. The visor 52 and the mirror 54 accordingly rotate) together with the drive body 22 so as to be either stored or deployed.

Figure 4:
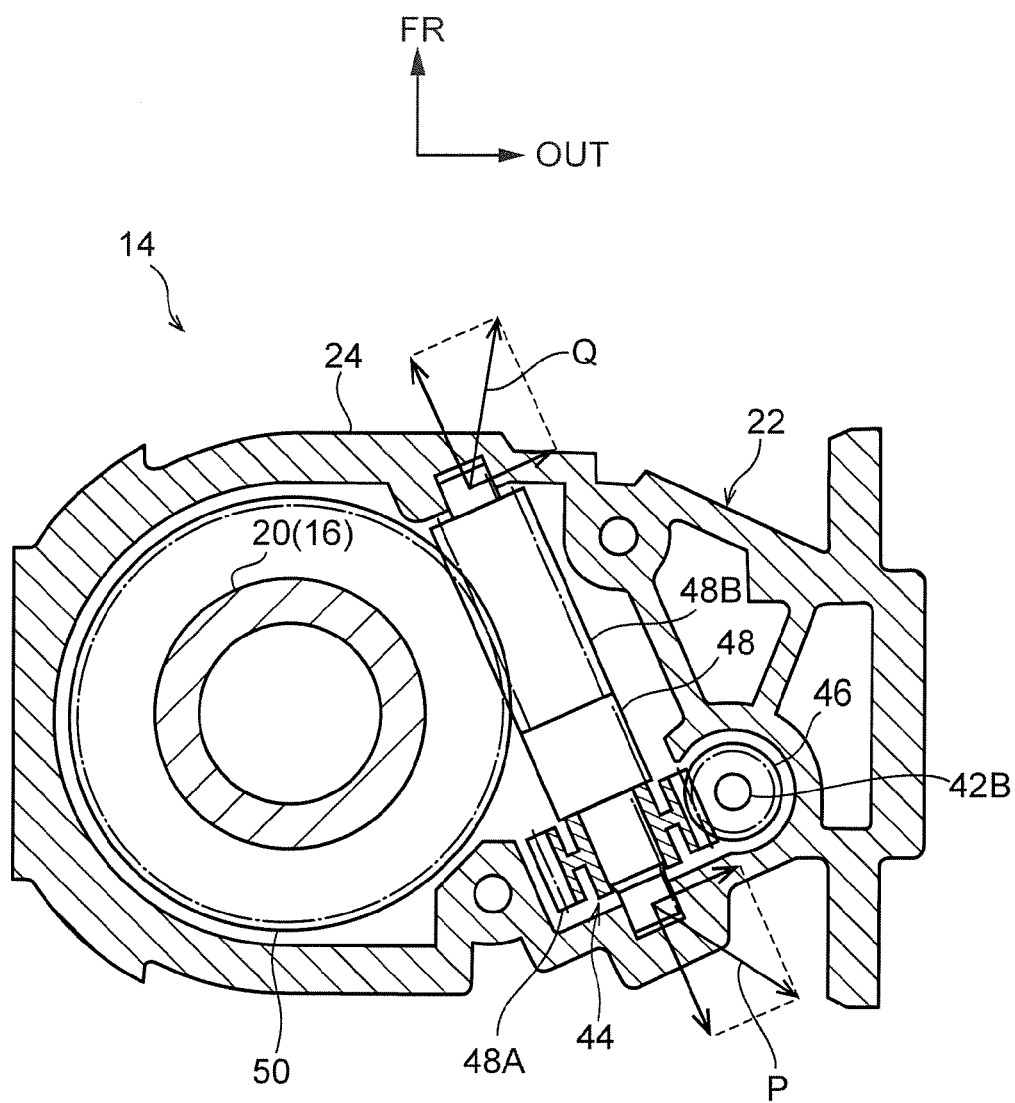
FIG. 4 is a cross-section (a cross-section along line 4-4 in FIG. 2) illustrating a storing mechanism of a vehicle door mirror device of an exemplary embodiment, as viewed from above.
Figure 5:
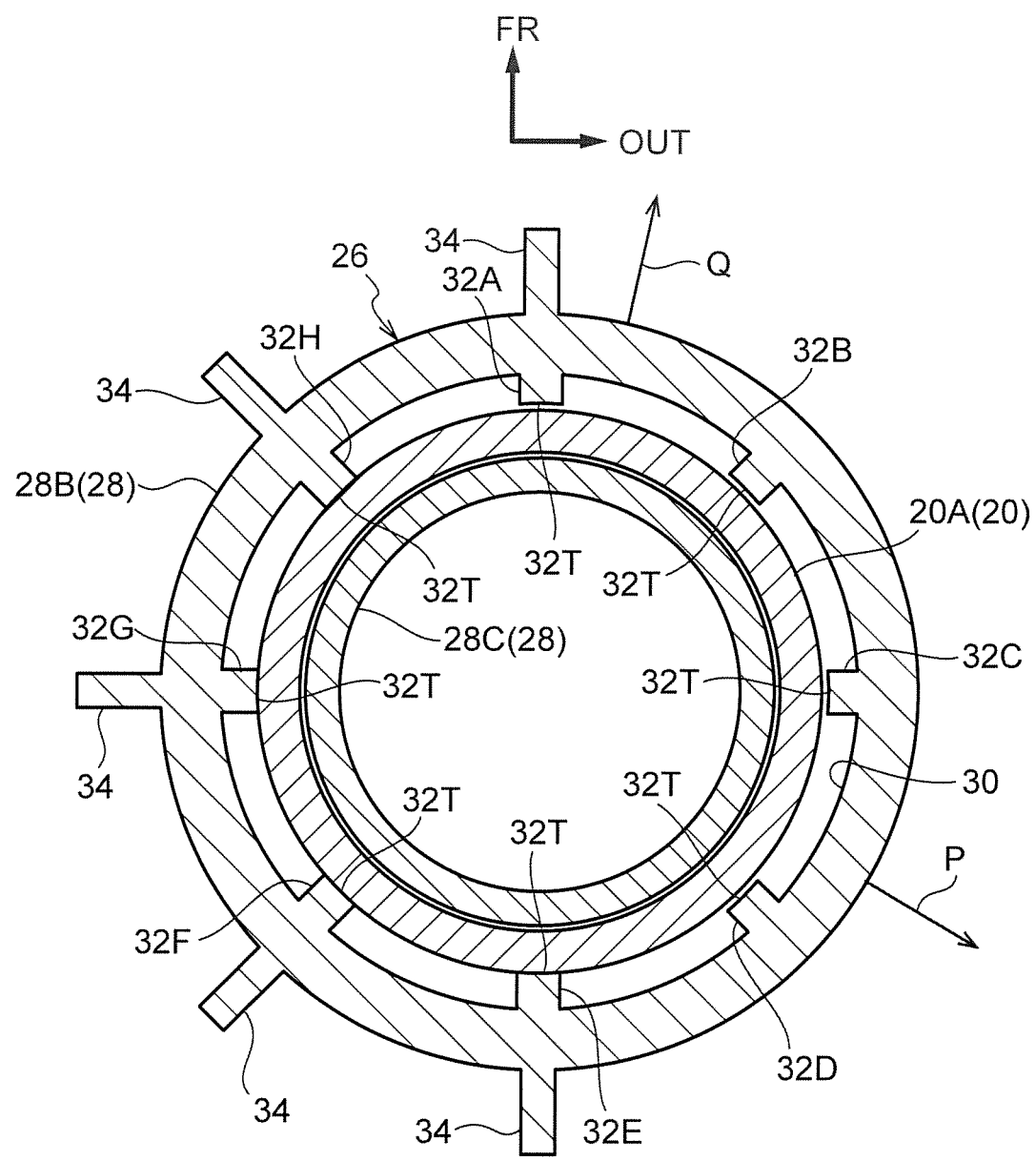
FIG. 5 is a cross-section (a cross-section along line 5-5 in FIG. 3) illustrating relevant portions of a storing mechanism of a vehicle door mirror device of an exemplary embodiment, in a state in which a motor base is not tilted with respect to a support shaft, as viewed from above.

When storing the visor 52 and the mirror 54, tilt force tilting with respect to the support shaft 20 acts on the drive body 22 in a direction in which the motor base 26 is moved in the direction of arrow P in FIG. 4 and FIG. 5. Movement force toward the support tube 20A side thus acts mainly in the contact ribs 32G to 32H of the contact tube 28B.

On the other hand, when deploying the visor 52 and the mirror 54, tilt force tilting with respect to the support shaft 20 acts on the drive body 22 in a direction in which the motor base 26 is moved in the direction of arrow Q in FIG. 4 and FIG. 5. Movement force toward the support tube 20A side thus acts mainly in the contact ribs 32E and 32F of the contact tube 28B.

Note that in the contact tube 28B, the projection leading end faces 32T of the contact ribs 32E to 32H are disposed at the radial direction inside of the imaginary circular circumferential plane in which the projection leading end faces 32T of the contact ribs 32A to 32D are disposed. In a state in which the drive body 22 (including the motor base 26) is not tilted with respect to the support shaft 20, the projection leading end faces 32T of the contact ribs 32E to 32H have a smaller gap dimension to the outer peripheral face of the support tube 20A than that of the projection leading end faces 32T of the contact ribs 32A to 32D.

The tiltable angle of the drive body 22 with respect to the support shaft 20 can accordingly be effectively reduced, tilting of the drive body 22 with respect to the support shaft 20 can be effectively suppressed, and tilting of the visor 52 and the mirror 54 with respect to the support shaft 20 can be effectively suppressed. Since chatter of the mirror 54 can be effectively suppressed during vehicle travel, for example, a reduction in the visibility that the mirror 54 offers to the occupant can be effectively suppressed.

When storing or deploying the visor 52 and the mirror 54, at least the projection leading end faces 32T of the contact ribs 32A to 32D do not rub (slide) against the outer peripheral face of the support tube 20A. Frictional force between the motor base 26 and the support shaft 20 can accordingly be reduced, thereby enabling obstruction due to frictional force between the motor base 26 and the support shaft 20 to be suppressed when storing and deploying the visor 52 and the mirror 54.

When storing the visor 52 and the mirror 54, tilt force tilting with respect to the support shaft 20 acts on the drive body 22. The projection leading end faces 32T of the contact ribs 32G and 32H, on which movement force toward the side of the support tube 20A acts, are disposed at the radial direction inside of the imaginary circular circumferential plane in which the projection leading end faces 32T of the contact ribs 32A to 32D are disposed (have a smaller gap dimension to the support tube 20A than the projection leading end faces 32T of the contact ribs 32A to 32D in a state in which the drive body 22 is not tilted with respect to the support shaft 20).

When deploying the visor 52 and the mirror 54, tilt force tilting with respect to the support shaft 20 acts on the drive body 22. The projection leading end faces 32T of the contact ribs 32E and 32F, on which movement force toward the side of the support tube 20A acts, are disposed at the radial direction inside of the imaginary circular circumferential plane in which the projection leading end faces 32T of the contact ribs 32A to 32D are disposed (have a smaller gap dimension to the support tube 20A than the projection leading end faces 32T of the contact ribs 32A to 32D in a state in which the drive body 22 is not tilted with respect to the support shaft 20).

Accordingly, when storing and deploying the visor 52 and the mirror 54, the projection leading end faces 32T of the contact ribs 32G to 32H and the projection leading end faces 32T of the contact ribs 32E to 32F respectively contact the outer peripheral face of the support tube 20A, thereby enabling tilting of the drive body 22 with respect to the support shaft 20 to be effectively suppressed. Tilting of the visor 52 with respect to the support shaft 20 can accordingly be effectively suppressed, enabling the visor 52 to be suppressed from rubbing against the stay 12 on the vehicle body side.

Moreover, tilt force tilting with respect to the support shaft 20 acts on the drive body 22 due to the load of the visor 52, the mirror 54, and the like. The projection leading end faces 32T of the contact ribs 32F to 32H, on which movement force toward the support tube 20A side acts, are disposed at the radial direction inside of the imaginary circular circumferential plane on which the projection leading end faces 32T of the contact ribs 32A to 32D are disposed (have a smaller gap dimension to the support tube 20A than the projection leading end faces 32T of the contact ribs 32A to 32D in a state in which the drive body 22 is not tilted with respect to the support shaft 20). By the projection leading end faces 32T of the contact ribs 32F to 32H contacting the outer peripheral face of the support tube 20A, the drive body 22 can be effectively suppressed from tilting with respect to the support shaft 20 due to the load of the visor 52, the mirror 54, and the like, and tilting of the visor 52 and the mirror 54 with respect to the support shaft 20 can be effectively suppressed.

The contact ribs 32E to 32H that are needed in order to effectively suppress tilting of the drive body 22 with respect to the support shaft 20 when storing or deploying the visor 52 and the mirror 54 approximately the same as the contact ribs 32F to 32H that are needed in order to effectively suppress tilting of the drive body 22 with respect to the support shaft 20 due to the load of the visor 52, the mirror 54, and the like. (Namely, the contact ribs 32F to 32H are the same in the both.) Accordingly, the tiltable angle of the drive body 22 with respect to the support shaft 20 can be efficiently reduced by disposing the contact ribs 32A to 32D, these not being involved in effectively suppressing tilting of the drive body 22 with respect to the support shaft 20, at circumferential direction positions of the contact tube 28B on the opposite side to the contact ribs 32E to 32H, and disposing the projection leading end faces 32T of the contact ribs 32A to 32D at the radial direction outside of the imaginary circular circumferential plane on which the projection leading end faces 32T of the contact ribs 32E to 32H are disposed. Tilting of the drive body 22 with respect to the support shaft 20 can accordingly be efficiently suppressed, and tilting of the visor 52 and the mirror 54 with respect to the support shaft 20 can also be efficiently suppressed.

Note that in the present exemplary embodiment, the contact ribs 32A to 32H are provided to the inner peripheral face of the contact tube 28B. However, the contact ribs 32A to 32H may be provided to the outer peripheral face of the insertion tube 28C.

In the present exemplary embodiment, the vehicle visual recognition device is applied to the vehicle door mirror device 10. However, the vehicle visual recognition device of may be applied to another vehicle outer mirror device external to the vehicle (such as a vehicle fender mirror device), or to a vehicle inner mirror device inside the vehicle.

In the present exemplary embodiment, the mirror 54 configures a visual recognition section. However, the visual recognition section may be configured by a camera that assists vision of the vehicle occupant using captured images.

What is claimed is:

1. A vehicle visual recognition device, comprising:
a support shaft that is supported on a member at a vehicle body side;
a rotating member that is rotatably supported at the support shaft;
a plurality of contact portions that are provided at the rotating member and that are configured to contact the support shaft, wherein a projection leading end face of at least one of the contact portions is disposed at an inner side in a radial direction of a circle concentric with the support shaft, and a projection leading end face of another of the contact portions is disposed at an outer side in a radial direction of the concentric circle such that the projection leading end faces of different contact portions have different radial distances from a center axis of the rotating member; and
a visual recognition section that is provided so as to be capable of rotating integrally with the rotating member, that assists visual recognition of a vehicle occupant, and that is stored or deployed by rotating the rotating member.

2. A vehicle visual recognition device, comprising:
a support shaft that is supported on a member at a vehicle body side; a rotating member that is rotatably supported at the support shaft;
a plurality of contact portions that are provided at the rotating member and that are configured to contact the support shaft, wherein a gap dimension between at least one of the contact portions and the support shaft is smaller than a gap dimension between another of the contact portions and the support shaft, in a state in which the rotating member is not tilted with respect to the support shaft;
wherein a first gap dimension between the at least one of the contact portions and the support shaft is a distance which is, in a direction orthogonal to an axis direction of the support shaft, between a projection leading end face of the at least one of the contact portions and a peripheral face of the support shaft, and wherein a second gap dimension between the another of the contact portions and the support shaft is a different distance which is, in said direction, between the projection leading end face of the another of the contact portions and the peripheral face of the support shaft; and
a visual recognition section that is provided so as to be capable of rotating integrally with the rotating member, that assists visual recognition of a vehicle occupant, and that is stored or deployed by rotating the rotating member.

3. The vehicle visual recognition device of claim 1, wherein the at least one of the contact portions is a contact portion on which movement force toward a side of the support shaft acts when the rotating member is rotated and a force to tilt with respect to the support shaft acts on the rotating member.

4. The vehicle visual recognition device of claim 2, wherein the at least one of the contact portions is a contact portion on which movement force toward a side of the support shaft acts when the rotating member is rotated and a force to tilt with respect to the support shaft acts on the rotating member.

5. The vehicle visual recognition device of claim 1, wherein the at least one of the contact portions is a contact portion on which movement force toward a side of the support shaft acts due to a force to tilt with respect to the support shaft side acting on the rotating member due to a load of the visual recognition section.

6. The vehicle visual recognition device of claim 2, wherein the at least one of the contact portions is a contact portion on which movement force toward a side of the support shaft acts due to a force to tilt with respect to the support shaft side acting on the rotating member due to a load of the visual recognition section.

7. The vehicle visual recognition device of claim 3, wherein the at least one of the contact portions is a contact portion on which movement force toward a side of the support shaft acts due to a force to tilt with respect to the support shaft side acting on the rotating member due to a load of the visual recognition section.

8. The vehicle visual recognition device of claim 4, wherein the at least one of the contact portions is a contact portion on which movement force toward a side of the support shaft acts due to a force to tilt with respect to the support shaft side acting on the rotating member due to a load of the visual recognition section.

* * * * *